(12) United States Patent
Chen et al.

(10) Patent No.: US 11,334,935 B2
(45) Date of Patent: May 17, 2022

(54) METHOD, SYSTEM, AND MANUFACTURE FOR LIGHT HYPERGRAPH BASED RECOMMENDATION

(71) Applicant: International Business Machines Corporation, Armonk, NY (US)

(72) Inventors: Chao Chen, Shanghai (CN); Dong Sheng Li, Shanghai (CN); Stephen My Chu, Beavercreek, OH (US); Jun Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 63 days.

(21) Appl. No.: 17/012,420

(22) Filed: Sep. 4, 2020

(65) Prior Publication Data
US 2022/0076314 A1  Mar. 10, 2022

(51) Int. Cl.
*G06Q 30/00* (2012.01)
*G06Q 30/06* (2012.01)
*G06F 16/901* (2019.01)

(52) U.S. Cl.
CPC ..... *G06Q 30/0631* (2013.01); *G06F 16/9024* (2019.01)

(58) Field of Classification Search
CPC ..... G06Q 30/0601–0645; G06Q 30/08; G06Q 30/0631; G06F 16/9024
See application file for complete search history.

(56) References Cited

U.S. PATENT DOCUMENTS

| 11,113,745 B1* | 9/2021 | Cetintas ............. G06Q 30/0282 |
| 2014/0122228 A1* | 5/2014 | Wical ..................... G06Q 30/02 705/14.53 |
| 2015/0169758 A1 | 6/2015 | Assom et al. |

(Continued)

FOREIGN PATENT DOCUMENTS

| CN | 103116639 B | 5/2016 |
| CN | 105447013 A | 6/2016 |
| CN | 108038746 A | 5/2018 |

OTHER PUBLICATIONS

Sharma, Ankit. "Hypergraph Analytics: Modeling Higher-Order Structures and Probabilities." Order No. 27996209 University of Minnesota, 2020. Ann Arbor: ProQuest. Web. Dec. 30, 2021. (Year: 2020).*

(Continued)

*Primary Examiner* — Jeffrey A. Smith
*Assistant Examiner* — Kennedy Gibson-Wynn
(74) *Attorney, Agent, or Firm* — Cantor Colburn LLP; Joseph Petrokaitis

(57) ABSTRACT

Aspects of the invention include a computer-implemented method for generating product recommendations used a hypergraph. The computer-implemented method includes generating a product embedding vector for a product unpurchased by a consumer based on a hypergraph. Generating a consumer embedding vector for the consumer based on the hypergraph. An affinity between the consumer and a product unpurchased by the consumer is scored based on the product embedding vector and the consumer embedding vector. A digital description of the unpurchased product is retrieved based on the scoring. The digital description is presented to the consumer.

20 Claims, 6 Drawing Sheets

(56) References Cited

U.S. PATENT DOCUMENTS

2019/0080383 A1* 3/2019 Garcia Duran ...... G06N 3/0427
2019/0325343 A1* 10/2019 Feng ................... G06F 16/9024
2020/0057809 A1* 2/2020 Xu ....................... G06K 9/6218
2021/0051121 A1* 2/2021 Menon .................... G06N 3/08

OTHER PUBLICATIONS

Sybrandt, Justin. "Exploiting Latent Features of Text and Graphs." Order No. 27832415 Clemson University, 2020. Ann Arbor: ProQuest. Web. Mar. 18, 2022. (Year: 2020).*

Xuxiao, Bu, Zhu Jihua, and Qian Xueming. "Personalized Product Search Based on User Transaction History and Hypergraph Learning." Multimedia Tools and Applications 79.31-32 (2020): 22157-75. ProQuest. Web. Mar. 18, 2022. (Year: 2020).*

Nzekon Nzeko'o Armel Jacques. "A general graph-based framework for top-N recommendation using content, temporal and trust information." researchgate.net/publications. Jun. 12, 2019. 30 Pages.

* cited by examiner

METHOD, SYSTEM, AND MANUFACTURE FOR LIGHT HYPERGRAPH BASED RECOMMENDATION

BACKGROUND

The present invention generally relates to programmable computing systems, and more specifically to computing systems, computer-implemented methods, and computer program products configured and arranged to implement light hypergraph based recommendations.

A computer-based product recommendation engine monitors a consumer's online buying behavior and provides targeted product recommendations based on the behavior. The recommendations can be provided to the consumer by targeted online advertising, electronic mail, or direct mailing. The product recommendation engine selects the product recommendations based on processing large amounts of consumer data, including online purchasing records, web browser search queries, and multiple consumer profiles. The consumer data is processed to organize consumers into groups having similar purchasing habits. Based on the purchasing history of a group's members, the product recommendation can direct a product recommendation to an individual group member.

SUMMARY

Embodiments of the present invention are directed to a computer-implemented method of implementing a light hypergraph based recommendation. A non-limiting example computer-implemented method includes generating a product embedding vector for a product unpurchased by a consumer based on a hypergraph. Generating a consumer embedding vector for the consumer based on the hypergraph. An affinity between the consumer and a product unpurchased by the consumer is scored based on the product embedding vector and the consumer embedding vector. A digital description of the unpurchased product is retrieved based on the scoring. The digital description is presented to the consumer.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
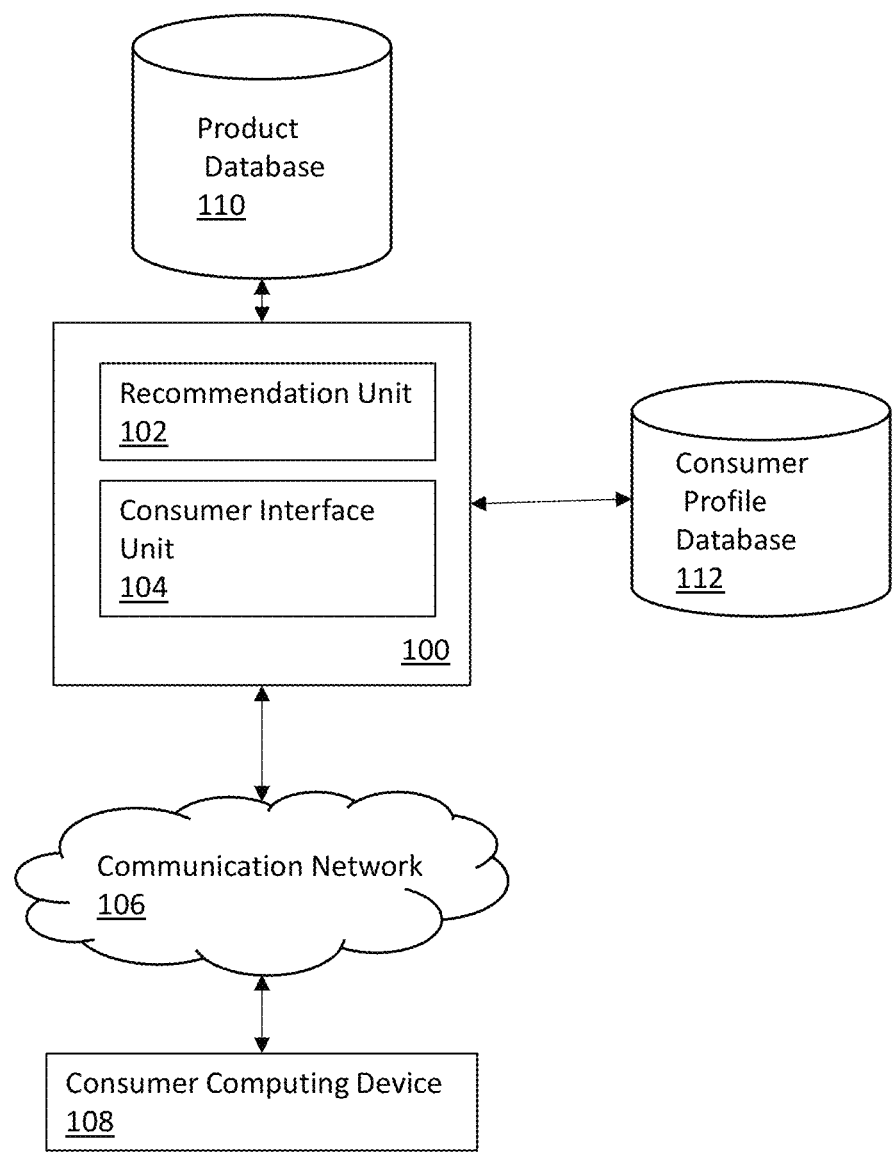
FIG. 1 illustrates a block diagram of components of a product recommendation system in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

One or more embodiments of the present invention provide computer-implemented methods, computing systems, and computer program products for recommending products to consumers based on analysis of a hypergraph describing consumers and related purchased products.

Conventional product recommendation systems attempt to determine consumer preferences through the analysis of historical consumer data, including purchases and reviews. Based on the buying preferences, a product recommendation system can generate one or more product recommendations for a consumer. Conventional systems use filtration techniques that rely on the construction of a Laplacian matrix table to understand consumer behavior. Each filtration technique uses Laplacian matrix tables that include columns that hold values for each described consumer and rows that hold values for each described product or vice versa. The values are generated from each consumer's historical purchase data and their product reviews. The filtration process further involves comparing column values and row values to each other to determine positively regarded features or similarities between consumers.

Unfortunately, both Laplacian matrix table-based approaches require the time-consuming process of continuous parameter updating to continue to produce useful recommendations. The approaches also require continuous consumer feedback to generate negative values to prevent overfitting a model. For example, a consumer providing feedback that they did not buy a recommended product would result in a negative value. Unfortunately, consumers do not always provide this feedback. This issue also presents itself during the training of a machine learning model, in which the lack of negative value training instances results in an overfitted model. Overfitting causes the product recommendation system overgeneralizes a consumer's preferences and poorly discriminates between a recommendation that strongly matches a consumer's preferences and a recommendation the does not strongly match the consumer's preferences. In some instances, the system attempt to compensate for the absence of receiving feedback from consumers treating missing values in a matrix table as a negative value. However, this approach does accurately reflect the consumer's true buying choices and is dependent upon the sparsity of the missing values.

One or more embodiments of the present invention address one or more of the above-described shortcomings by providing computer-implemented methods, computing systems, and computer program products that generate product recommendations for user. Embodiments of the present invention provide a hypergraph-based product recommendation system that utilizes an incidence matrix of the hypergraph to generate consumer vectors and product vectors that can be used to generate product recommendations for consumers. Embodiments of the present invention provided a closed-loop solution that removes the need for continuous parameter updating and the introduction of negative values.

Turning now to FIG. 1, a product recommendation system 100 is generally shown in accordance with one or more embodiments of the present invention. The product recommendation system 100 includes a recommendation unit 102 for receiving consumer data and product data to generate a product recommendation for a consumer. The product recommendation system 100 is communicatively coupled to a product database 110 and a consumer profile database 112, configured and arranged as shown. Additionally, the product recommendation system 100 is in communication with a consumer computing device 108 through a communication network 106.

In some embodiments of the present invention, the recommendation unit 102 is arranged as a neural network, for example, a graph neural network (GNN). The consumer interface unit 104 is configured to direct a product recommendation to a consumer. In some embodiments of the invention, the functionality of the consumer interface unit 104 is implemented by the consumer interface unit 104 retrieving a digital advertisement for the recommended product, directing the advertisement to the consumer, directing initiation of a direct mailing to a consumer, and directing an electronic mail to a consumer. The product recommendation system 100 is operable to receive product data from one or more product databases 110 for receiving product information, including digital advertisements.

The recommendation unit 102 can receive from the product database 110 and the consumer profile database 112 product data and consumer data. The product data can include a description of a subset of products from a universe of available products and the consumer data includes a description of consumers from a universe of consumers. The product data can further include an identification in the form of an alphanumeric string, in which each product includes a unique identification. The consumer data can also include an identification in the form of an alphanumeric string, in which each consumer includes a unique identification. The consumer data can further include each product purchased by each consumer. In addition to receiving information from the product database 110 and the consumer profile database 112, the recommendation unit 102 can also be configured to retrieve the product data and the consumer data from various sources, for example, an e-commerce website executing the product recommendation system, a third-party vendor, a financial institution, or other appropriate source.

In accordance with aspects of the invention, the recommendation unit 102 can employ a hypergraph spectral learning technique to learn the consumer embedding vectors and the product embedding vectors. An embedding is a mapping of a discrete variable to a vector, for example, a consumer vector or a product vector. The recommendation unit 102 can receive the product and consumer data and generate a hypergraph defined as G, in which G=(U, J) where U is a set of vertices (products) and J is a set of hyperedges/edges (consumers). Two or more vertices of the hypergraph G are considered to be adjacent vertices, if they belong to the same edge. A vertex $U_i$ and an edge of a hypergraph G are considered to be incident if U∈J. The number of edges of a hypergraph G that are incident to a given vertex is called the degree of the vertex. The degree of an edge is the number of vertices of the hypergraph incident to this edge. Based on the hypergraph G with n vertices and m edges, the recommendation unit 102 can generate by an incidence matrix H (i.e., by the n×m incidence matrix $\|H\|$), in which the columns correspond to the edges and the rows correspond to the vertices of the hypergraph G. The incidence matrix H comprises columns for each customer and rows for each product. For the purposes of this application, a logical 1 value in a cell of the incidence matrix denotes that a consumer has purchased the product, and a logical 0 value in a cell denotes that the consumer has not purchased the product. In some embodiments of the present invention, the incidence matrix H has considerably more rows than columns and the incidence matrix H can be a "tall and skinny matrix".

Based on the hypergraph G, the recommendation unit 102 can also generate the diagonal degree matrix $D_u$ ($D_J$) of the set of vertices U (set of edges J) based on the hypergraph G. $D_J$ ($D_u$) denotes the diagonal degree matrix with entries $D_J$ (ii)=H'$_i$1 ($D_u$(uu)=H$_u$ 1), and based upon empirical research $D_u^{-1/2} H D_J^{-1/2} = U\Sigma V$.

Once the recommendation unit 102 has generated the incidence matrix H and the diagonal degree matrix $D_u$ ($D_J$), the recommendation unit 102 can determine a number of clusters k of products in the subset of products. In many instances, the products from a product database 110 have previously been grouped together and k is known. However, periodically as products enter or leave the market, consumer purchasing choices change, or other market forces change, the ungrouped products need to be identified with a group. In these instances, the recommendation unit 102 can apply a k-means clustering algorithm (e.g., k-nearest neighbor, KNN) to group the new products and determine k. The clustering algorithm clusters groups of products together based on similarity. The new products are identified and grouped based on at least one relevant feature of the product. The relevant feature can vary based on the desired recommendation. For example, the relevant feature can be the class of product, for example, kitchenware, gardening, musical type, or other relevant features.

Upon determining k, the recommendation unit 102 derive a product embedding vector (V*) by solving the following equation:

$$V^* = \operatorname*{argmin}_{rank(V)=k} \|D_J^{-1/2} \mathcal{H}^* D_u^{-1/2} - V\Sigma U^*\|_2 =$$

$$\operatorname*{argmin}_{rank(V)=k} \|V(2I - D_J^{-1/2} \mathcal{H}^* D_u^{-1/2} \mathcal{H} D_J^{-1/2}) V^*\|_2,$$

where V* is a combination of k-dimensions eigenvectors from the hypergraph Laplacian matrix L, in which L=2I− $D_J^{-1/2} H^* D_u^{-1} H D_J^{-1/2}$.

The solution for determining the product embedding vector V* is identical to the k-smallest eigenvectors of the hypergraph Laplacian matrix L. The eigenvectors are composed of eigenvalues and characterize a relationship between consumers and products. For example, a consumer embedding vector characterizes a relationship between a consumer and products purchased by the consumer. A product embedding vector characterizes a relationship between the product and consumers that have purchased the product. Therefore, to find the solution for the product embedding $V^*$ vector, recommendation unit 102 can calculate the k-smallest eigenvectors of the hypergraph Laplacian matrix L. This method of deriving the product embedding vector $V^*$, using the incidence matrix H, reduces the reconstruction error for the Laplacian matrix L that is found in conventional recommendation systems. As a result, a result the deviation from an estimated purchasing history and an actual purchasing history (as described by incidence matrix H) is minimized.

The recommendation unit 102 can then derive a consumer embedding vector $U_U^*$. The solution for the consumer embedding vector can be viewed as an optimization problem, in which the recommendation unit 102 determines the optimum vector to represent the consumer. This can be solved through minimization of the below objective function based in part on Laplacian shrinkage regression analysis of the hypergraph G. The recommendation unit 102 first solves for the following parameters $\lambda_1$ and $\gamma$ by solving the below minimization problem:

$$\operatorname*{Min}_{U_u^*} \left\| \mathcal{H}_u^+ D_{\mathcal{J}}^{-1/2} - deg^{\frac{1}{2}}(u) V \Sigma U_u^* \right\|^2 + \rho(|U_u^*|; \lambda_1, \gamma) + \frac{1}{2}\beta' L_0 \beta,$$

$$\rho(|\beta|; \lambda_1, \gamma) = \lambda_1 \int_0^{|\beta|} \max(1 - t/\gamma\lambda_1, 0)dt, \text{ where}$$

$$\beta = U_U^*.$$

In which the recommendation unit 102 solves for $\beta$ by systematically choosing input values from within an allowed set and computing the value of the above described function.

The recommendation unit 102 can score an affinity between a consumer and an unpurchased product based on the consumer embedding vector and product embedding vectors for unpurchased products. The affinity score can be based on a similarity of products purchased by the consumer and products purchased by other consumers. For example, consumer a has either purchased product "1", is viewing product "1" on a website, has entered a search query for product "1" on a web browser, or has placed product "1" into a digital shopping cart. Furthermore, consumers x, y, and z have previously purchased product "1", consumers x, y, and z have also previously purchased product "2", and consumers y and z have also previously purchased product "3". The recommendation unit's calculated score for consumer a would show the highest affinity score for product "2" and the second highest score for product "3". In some embodiments of the present invention, the affinity score can be calculated based on solving the affinity vector, $H_U^*$, using following equation:

$$H_U^* = deg^{1/2}(u) V \Sigma U_u^* D_{\mathcal{J}}^{1/2}$$

In other embodiments of the present invention, the affinity score can be based on a calculation of the distance between the affinity vector $H_U^*$ and a product embedding vector $V^*$ for an unpurchased product. The recommendation unit 102 can employ various techniques to determine the distance between the vectors, for example, cosine similarity. The affinity score can be proportional to the distance between the affinity vector and the product embedding vector. For example, the affinity score can be higher the closer the consumer embedding vector is to the product embedding vector. The recommendation unit 102 can rank the unpurchased products based on the affinity score and determine the highest scoring unpurchased products. The recommendation unit 102 can present number l-highest scoring unpurchased products to the consumer.

The consumer interface unit 104 can receive a list of the l-highest scoring unpurchased products and provide the list to a consumer through various media. The consumer interface unit 104 can, in response to receiving the list of l-highest scoring unpurchased products, retrieve digital descriptions of the l-highest scoring unpurchased products from the product database. The digital descriptions can be generated by the vendors or the e-commerce websites selling the unpurchased products. The digital descriptions can include digital advertisements, or links to products. For example, if consumer a enters a query on an e-commerce website, the digital descriptions can include advertisements tailored for the e-commerce website. In another example, if consumer a enters a search query in a music or video streaming service, the digital descriptions can include a link to movie content or musical content. In yet even another example, the consumer interface unit 104 can be in operable communication with a printer and initiate the printing of a direct mailing advertisement to a consumer.

The phrases "neural network" and "machine learning" broadly describes a function of electronic systems that learn from data. A machine learning system, engine, or module can include a machine learning algorithm that can be trained, such as in an external cloud environment (e.g., the cloud computing environment 50), to learn functional relations between inputs and outputs that are currently unknown. In one or more embodiments, machine learning functionality can be implemented using a recommendation unit 102, having the capability to be trained to perform a currently unknown function. In machine learning and cognitive science, neural networks are a family of statistical learning models inspired by the biological neural networks of animals, and in particular, the brain. Neural networks can be used to estimate or approximate systems and functions that depend on a large number of inputs.

The recommendation unit 102 can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in the recommendation unit 102 that carry electronic messages between simulated neurons are provided with numeric weights that correspond to the strength or weakness of a given connection. During training, The weights can be adjusted and tuned based on experience, making the recommendation unit 102 adaptive to inputs and capable of learning. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Training the recommendation unit 102 can be performed by assembling training instances of consumers' purchase histories. The purchase histories can be fed into a machine learning model to train the model to recognize the similarity in product types, generation of product embedding vectors, consumer embedding vectors, affinity score vectors, and production of recommendations. The training can include determining a purchase history of each consumer in a group of consumers having similar purchase histories. A similarity of purchase history can be based on having a threshold number of the same products or product types purchased. The purchase histories of each of the consumers in the group can be aggregated and a subset of the purchasing histories can be used to generate training labels. The balance of the purchase history can be used to as training data to train a model to accurately associate a purchasing instance with a label.

The product recommendation system 100 can be in operable communication with the product database 110 for receiving inputs for the recommendation unit 102. Products include physical products, services (subscription-based services and non-subscription based services, warranties, performances, video streaming choices, musical concerts, and other goods and services. The product database 110 is accessible by one or more vendors to provide or remove product data and digital descriptions of the products.

The product recommendation system 100 can also be in operable communication with the consumer profile database 112 for receiving inputs for the recommendation unit 102. The consumer data profile can further include a purchasing history of the consumer to detail each product purchased by the consumer within a given time frame, for example, the past ten years.

The system 100 can be in operable communication with the consumer computing device 108 via a communication network 106. The system 100 can connect to the communication network 106 via a communications port, a wired transceiver, a wireless transceiver, and/or a network card. The communication network 106 can transmit data using technologies such as Ethernet, fiber optics, microwave, xDSL (Digital Subscriber Line), Wireless Local Area Network (WLAN) technology, wireless cellular technology, 5G, Bluetooth technology and/or any other appropriate technology.

Figure 2:
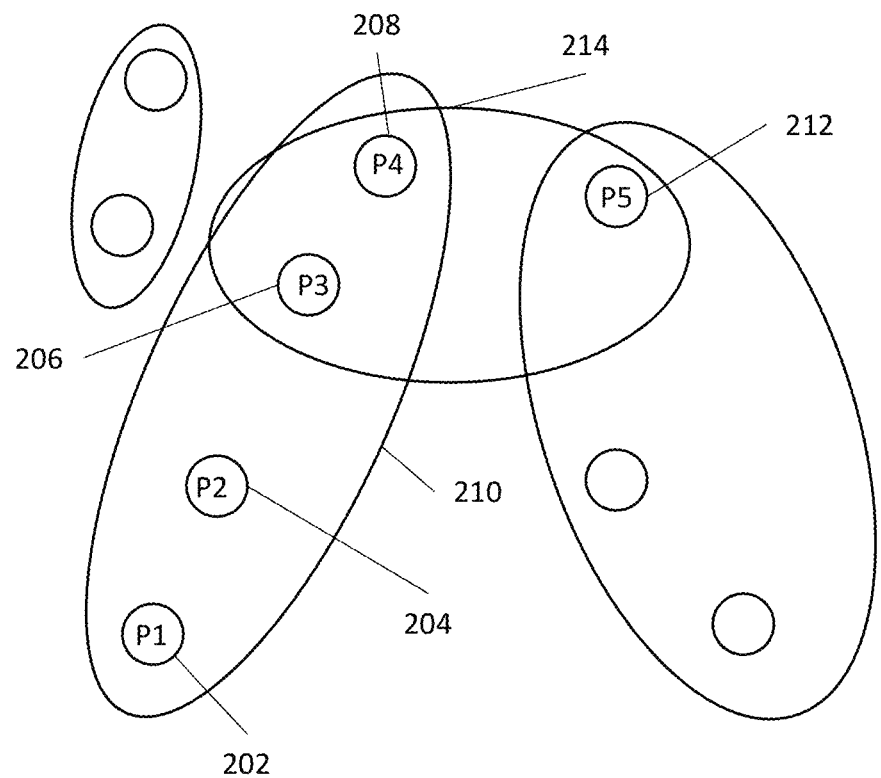
FIG. 2 illustrates a hypergraph in accordance with one or more embodiments of the present invention.

Referring to FIG. 2, a hypergraph 200 is illustrated in accordance with one or more embodiments of the present invention. A first vertex 202, a second vertex 204, a third vertex 206, and a fourth vertex 208 represent a first product, a second product, a third product, and a fourth product, respectively. The first, second, third, and fourth vertices 202, 204, 206, 208 belong to a first hyperedge 210 representing a first consumer. As illustrated, a product belonging to a consumer means that the customer has purchased the product. A fifth vertex 212 is illustrated to represent a fifth product. A second hyperedge 214 is illustrated to represent a second consumer. The fifth vertex 212, the third vertex 206, and the fourth vertex 208 also belong to the second hyperedge 214. This illustrates that the second consumer's purchase history overlaps with the first consumer's purchase history in terms of the third and fourth products. However, the second consumer has purchased a fifth product that the first consumer has not. As illustrated, the hypergraph 200 is a finite hypergraph as it depicts a finite number of nine products and a finite number four of consumers. However, it is appreciated that the hypergraph 200 could include any finite number of vertices and hyperedges based on a number of consumers and products.

Figure 3:
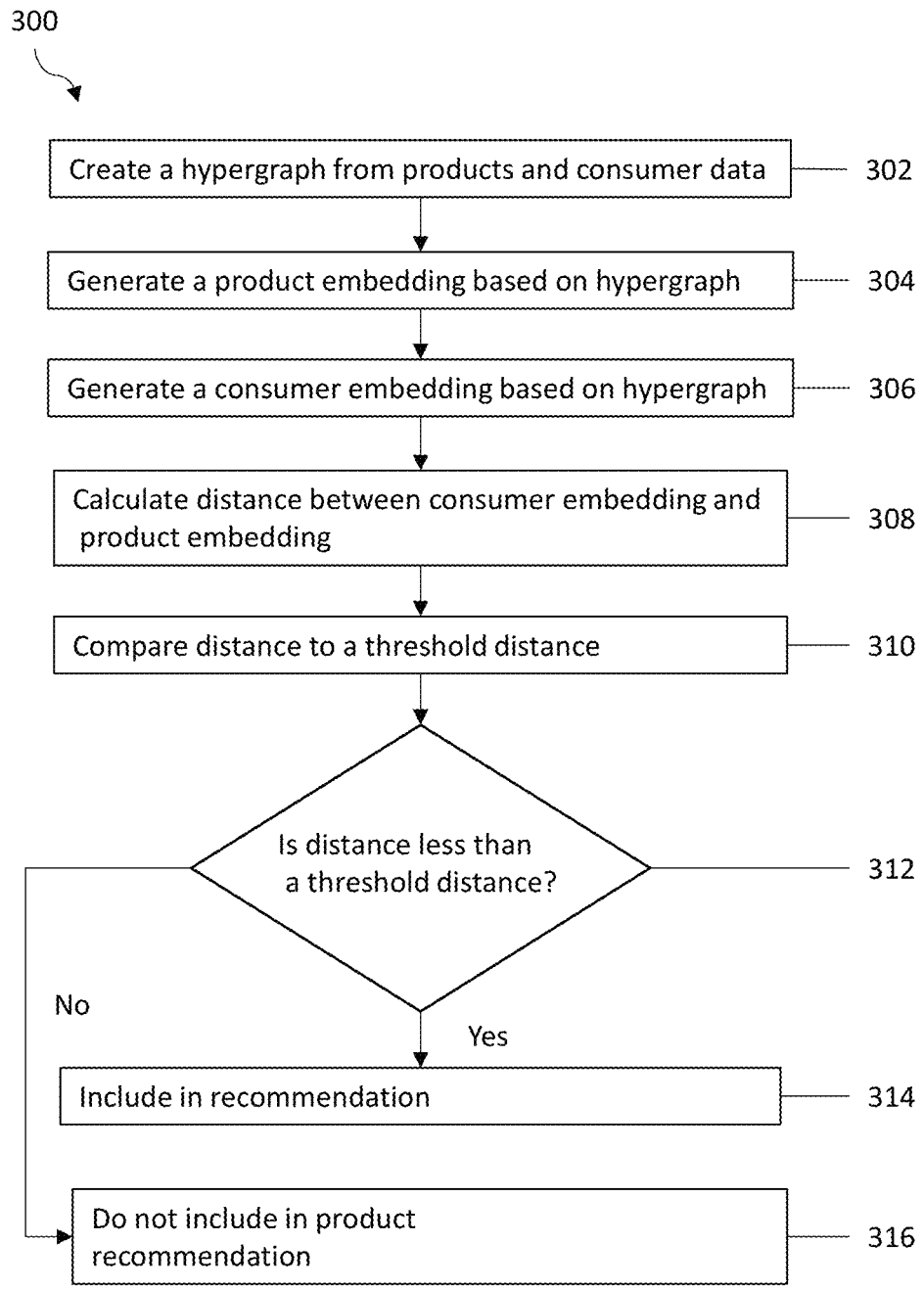
FIG. 3 illustrates a flow diagram of a computer-implemented process for product recommendation in accordance with one or more embodiments of the present invention.

Referring to FIG. 3, a computer-implemented process 300 for product recommendation is shown in accordance with one or more embodiments of the present invention. The process 300 is implemented by the system 100 (shown in FIG. 1). At block 302, the recommendation unit 102, in response to a consumer input, can create a hypergraph based on retrieved consumer and product data. The consumer input can be a search query entered by the consumer on a web browser, an e-commerce website, a streaming service website, or other comparable website. In addition the consumer input can be a selection of a product to view or purchase. Based on receiving the input, the recommendation unit 102 can analyze the input to determine a class of product. For example, if the consumer places a company Y tablet computing device into a digital shopping cart, the recommendation unit 102 can determine that the product belongs to a personal computing devices group. The determination can be based on detecting a group tag of the product. The group tag is metadata and can have previously been associated with the product by a vendor or third party e-commerce website, or other entity. In general, products have been pre-categorized, such that the company Y tablet has been previously tagged as a personal computing device.

Based on the determination that the consumer may be interested in personal computing devices, the recommendation unit 102 can retrieve data from x number of consumers that have purchased personal computing devices and data for the products that the x number of products related to personal computing devices. Again, the products and consumers can have been previously grouped using clustering algorithms. Based on the received consumer and product and data, the recommendation unit 102 creates a hypergraph, in which the products are represented by vertices and the consumers are represented by edges that surround products purchased by the respective consumers. The recommendation unit 102 can further generate an incidence matrix and a diagonal matrix based on the vertices and edges of the hypergraph.

At block 304, the recommendation unit 102 can generate a product vector from the vertices of the hypergraph. The recommendation unit 102 can use the incidence matrix and the diagonal matrix to derive a Laplacian hypergraph matrix. The recommendation unit 102 then calculates the eigenvectors of the Laplacian hypergraph matrix. The recommendation unit 102 then produces a produce embedding vector through the concatenation of the k-smallest eigenvectors.

At block 306, the recommendation unit 102 generates a consumer embedding vector. The recommendation unit 102 calculates the consumer embedding vector based at least in part solving for an optimum solution for the consumer embedding vector. This can be solved through Laplacian shrinkage regression analysis of the hypergraph. The calculation results in a consumer embedding vector, which is the concatenation of the k-smallest eigenvectors derived from the regression analysis of the hypergraph.

At block 308, the recommendation unit 102 calculates an affinity vector and calculates a distance between the affinity vector and a product embedding vector for a product unpurchased by the consumer. The affinity vector is calculated based on the product embedding vector and the consumer vector. The recommendation unit 102 can employ various methods to calculate the distance between the affinity vector and a product embedding vector for an unpurchased product. For example, the recommendation unit 102 can employ a cosine similarity method to calculate the distance. Based on the distance, the recommendation unit 102 determines a score for the unpurchased product. The score is proportional to the distance between the vectors. The higher the score, the closer the vectors are in relation to each other, and therefore, the better the products are as recommendations for the consumer. The closer the vectors are in relation to each other, the better the product is a candidate for recommendation to the consumer.

At block 310, the recommendation unit 102 compares the distance or score to a first threshold value for the distance or score. Even if an unpurchased product embedding vector is the closest to an affinity vector, the relationship may be so remote as to not warrant issuing a recommendation. Therefore, the recommendation unit 102 determines whether to issue the recommendation based at least in part on a threshold distance.

At block 312, the recommendation unit 102 determines whether the distance between the affinity vector and the unpurchased product vector is greater than or less than a second threshold distance. If the distance is less than the second threshold value, the recommendation unit 102 recommends the product to the consumer at block 314. If the distance is greater than the second threshold distance, the recommendation unit 102 does not recommend the product to the consumer at block 316. In some instances, the distance between the affinity vector and the unpurchased product vector is proportional to a score and the determination can be based on whether the score is greater than or less than a third threshold value. If the score is less than the third threshold value, the recommendation unit 102 recommends the product to the consumer at block 314. If the score is greater than the third threshold value, the recommendation unit 102 does not recommend the product to the consumer at block 316.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
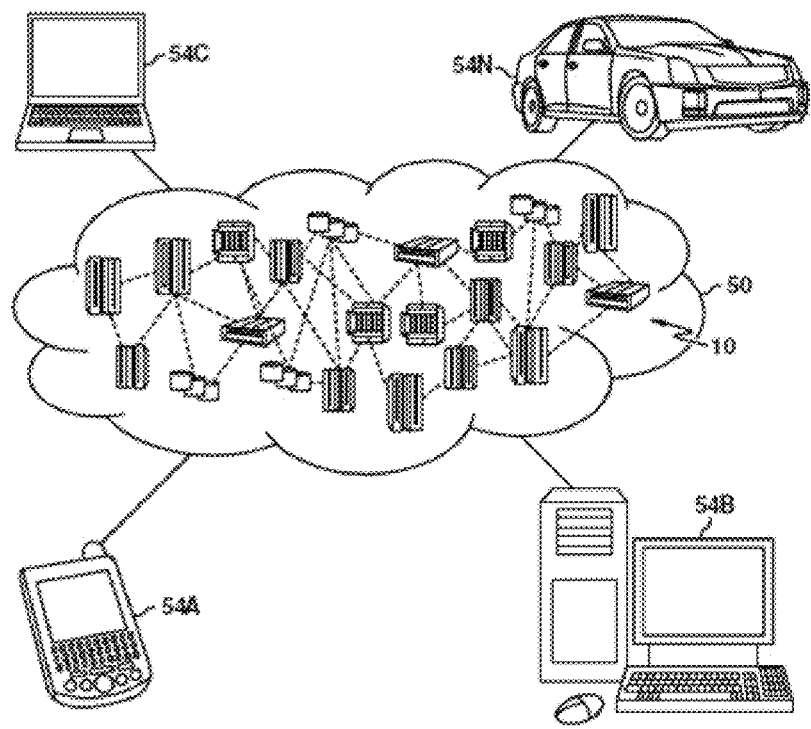
FIG. 4 illustrates a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
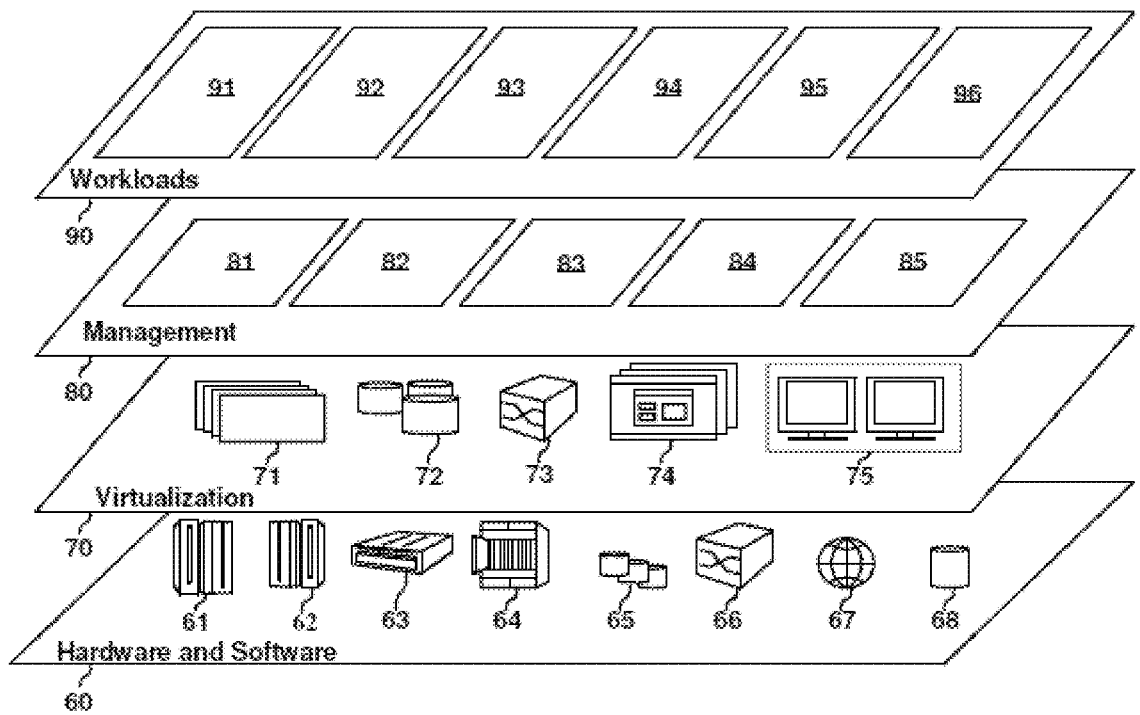
FIG. 5 illustrates abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and product recommendation 96.

Figure 6:
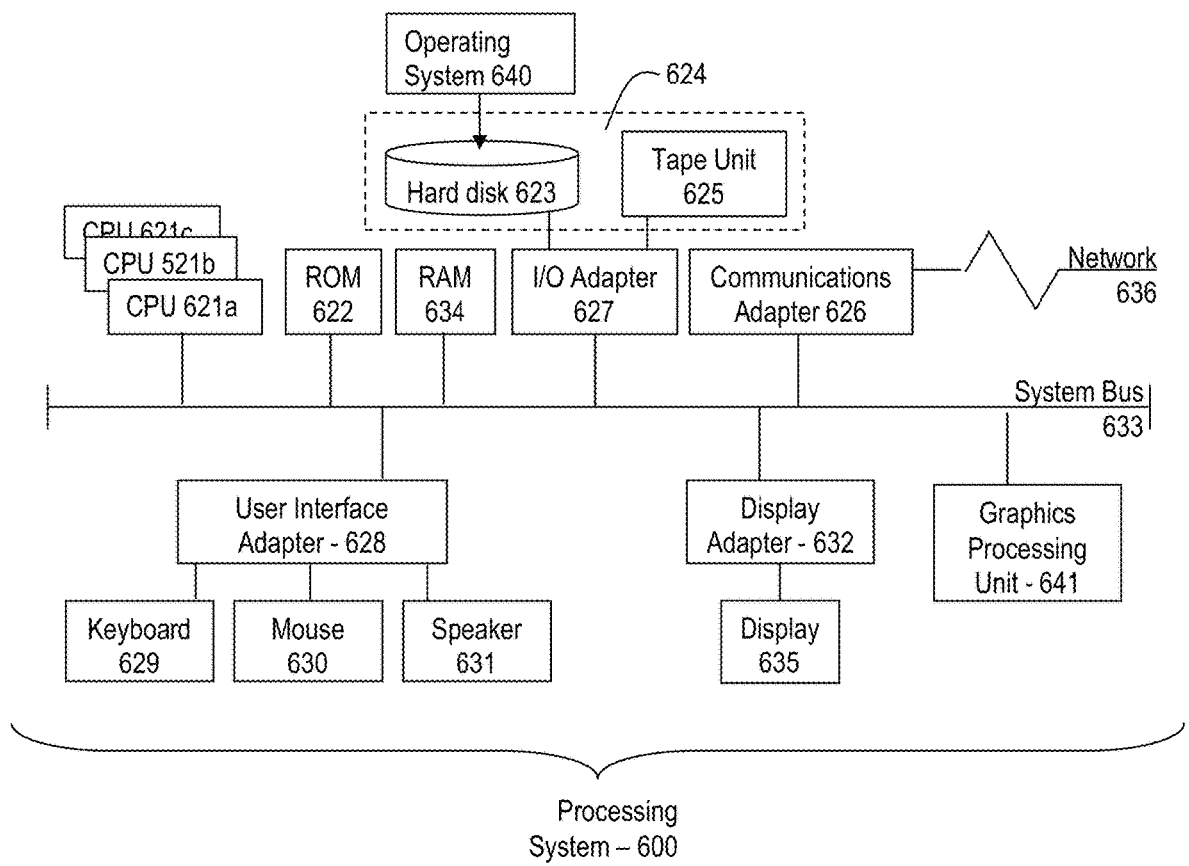
FIG. 6 illustrates a block diagram of a computer system for use in implementing one or more embodiments of the present invention.

It is understood that the present disclosure is capable of being implemented in conjunction with any other type of computing environment now known or later developed. For example, FIG. 6 depicts a block diagram of a processing system 700 for implementing the techniques described herein. In examples, the processing system 700 has one or more central processing units (processors) 621a, 621b, 621c, etc. (collectively or generically referred to as processor(s) 621 and/or as processing device(s)). In aspects of the present disclosure, each processor 621 can include a reduced instruction set computer (RISC) microprocessor. Processors 621 are coupled to system memory (e.g., random access memory (RAM) 624) and various other components via a system bus 633. Read only memory (ROM) 622 is coupled to system bus 633 and may include a basic input/output system (BIOS), which controls certain basic functions of the processing system 600.

Further depicted are an input/output (I/O) adapter 627 and a network adapter 626 coupled to the system bus 633. I/O adapter 627 may be a small computer system interface (SCSI) adapter that communicates with a hard disk 623 and/or a storage device 625 or any other similar component. I/O adapter 627, hard disk 623, and storage device 625 are collectively referred to herein as mass storage 634. Operating system 640 for execution on processing system 600 may be stored in mass storage 634. The network adapter 626 interconnects system bus 633 with an outside network 636 enabling processing system 600 to communicate with other such systems.

A display (e.g., a display monitor) 635 is connected to the system bus 633 by display adapter 632, which may include a graphics adapter to improve the performance of graphics intensive applications and a video controller. In one aspect of the present disclosure, adapters 626, 627, and/or 632 may be connected to one or more I/O busses that are connected to the system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 633 via user interface adapter 628 and display adapter 632. An input device 729 (e.g., a keyboard, a microphone, a touchscreen, etc.), an input pointer 630 (e.g., a mouse, trackpad, touchscreen, etc.), and/or a speaker 631 may be interconnected to system bus 633 via user interface adapter 628, which may include, for example, a Super I/O chip integrating multiple device adapters into a single integrated circuit.

In some aspects of the present disclosure, the processing system 600 includes a graphics processing unit 637. Graphics processing unit 637 is a specialized electronic circuit designed to manipulate and alter memory to accelerate the creation of images in a frame buffer intended for output to a display. In general, graphics processing unit 637 is very efficient at manipulating computer graphics and image processing and has a highly parallel structure that makes it more effective than general-purpose CPUs for algorithms where processing of large blocks of data is done in parallel.

Thus, as configured herein, the processing system 600 includes processing capability in the form of processors 621, storage capability including system memory (e.g., RAM 664), and mass storage 634, input means such as keyboard 629 and mouse 630, and output capability including speaker 631 and display 635. In some aspects of the present disclosure, a portion of system memory (e.g., RAM 624) and mass storage 634 collectively store the operating system 640 to coordinate the functions of the various components shown in the processing system 600.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
performing, by a processor, a hypergraph spectral machine learning operation comprising:
determining, by the processor, purchase history data for each consumer among a plurality of consumers, the purchase history data including different types of previously purchased products;
training the processor to learn a relationship between the plurality of consumers and the previously purchased products in response to generating a hypergraph that is based on the previously purchased products corresponding to the plurality of consumers, the hypergraph defined by a set of edges (J) representing the plurality of consumers and a set of vertices (U) representing the previously purchased products, wherein a given vertices of a given edge indicates a given previously purchased product corresponding to a given consumer among the plurality of consumers;
generating, by the processor, a product embedding vector for a product unpurchased by a target consumer based on the hypergraph, the product embedding vector indicating a relationship between a product type of a previously purchased product among the different types of previously purchased products and each of the consumers among the plurality of consumers that have purchased the product type;
generating, by the processor, a consumer embedding vector for the target consumer based on the hypergraph, the consumer embedding vector indicating a relationship between the given consumer and the previously purchased products corresponding to the given consumer;

scoring, by the processor, an affinity between the consumer and the unpurchased product based on the product embedding vector and the consumer embedding vector, the scoring including calculating an affinity vector based on a distance between the product embedding vector and the consumer embedding vector;

retrieving, by the processor, a digital description of the unpurchased product in response to the affinity vector being less than affinity threshold value; and presenting, by the processor, the digital description to the consumer.

2. The computer-implemented method of claim 1, wherein generating the product embedding vector comprises:

generating a Laplacian matrix from an incidence matrix and a diagonal matrix of the hypergraph; and calculating a set of product eigenvectors of the Laplacian matrix.

3. The computer-implemented method of claim 2, wherein the product embedding vector is a concatenation of the product eigenvectors.

4. The computer-implemented method of claim 1, wherein generating the consumer embedding vector comprises calculating a relation between the consumer and purchased products based at least in part on Laplacian shrinkage regression analysis of the hypergraph.

5. The computer-implemented method of claim 4, wherein the consumer embedding vector is a concatenation of the consumer eigenvectors.

6. The computer-implemented method of claim 1, wherein the scoring is based at least in part of a distance between the product embedding vector and the consumer embedding vector.

7. The computer-implemented method of claim 1, wherein the digital description comprises a digital advertisement or a hyperlink to the unpurchased product.

8. A system comprising:

a memory having computer readable instructions; and one or more processors for executing the computer readable instructions, the computer readable instructions controlling the one or more processors to perform operations comprising:

performing a hypergraph spectral learning operation comprising:

determining purchase history data for each consumer among a plurality of consumers, the purchase history data including different types of previously purchased products;

learning a relationship between the plurality of consumers and the previously purchased products in response to generating a hypergraph that is based on the previously purchased products corresponding to the plurality of consumers, the hypergraph defined by a set of edges (J) representing the plurality of consumers and a set of vertices (U) representing the previously purchased products, wherein a given vertices of a given edge indicates a given previously purchased product corresponding to a given consumer among the plurality of consumers;

generating a product embedding vector for a product unpurchased by a consumer based on the hypergraph, the product embedding vector indicating a relationship between a product type of a previously purchased product among the different types of previously purchased products and each of the consumers among the plurality of consumers that have purchased the product type;

generating a consumer embedding vector for the consumer based on the hypergraph, the consumer embedding vector indicating a relationship between the given consumer and the previously purchased products corresponding to the given consumer;

scoring an affinity between the consumer and the unpurchased product based on the product embedding vector and the consumer embedding vector, the scoring including calculating an affinity vector based on a distance between the product embedding vector and the consumer embedding vector;

retrieving a digital description of the unpurchased product in response to the affinity vector being less than an affinity threshold value; and presenting the digital description to the consumer.

9. The system of claim 8, wherein generating the product embedding vector comprises:

generating a Laplacian matrix from an incidence matrix and a diagonal matrix of the hypergraph; and calculating a set of product eigenvectors of the Laplacian matrix.

10. The system of claim 9, wherein the product embedding vector is a concatenation of the product eigenvectors.

11. The system of claim 8, wherein generating the consumer embedding vector comprises calculating a relation between the consumer and purchased products based at least in part on Laplacian shrinkage regression analysis of the hypergraph.

12. The system of claim 11, wherein the consumer embedding vector is a concatenation of the consumer eigenvectors.

13. The system of claim 8, wherein the scoring is based at least in part of a distance between the product embedding vector and the consumer embedding vector.

14. The system of claim 8, wherein the digital description comprises a digital advertisement or a hyperlink to the unpurchased product.

15. A computer program product comprising a computer readable storage medium having program instructions embodied therewith, the program instructions executable by a processor to cause the processor to perform operations comprising:

performing a hypergraph spectral learning operation comprising:

determining purchase history data for each consumer among a plurality of consumers, the purchase history data including different types of previously purchased products;

learning a relationship between the plurality of consumers and the previously purchased products in response to generating a hypergraph that is based on the previously purchased products corresponding to the plurality of consumers, the hypergraph defined by a set of edges (J) representing the plurality of consumers and a set of vertices (U) representing the previously purchased products, wherein a given vertices of a given edge indicates a given previously purchased product corresponding to a given consumer among the plurality of consumers;

generating a product embedding vector for a product unpurchased by a consumer based on the hypergraph, the product embedding vector indicating a relationship between a product type of a previously purchased product among the different types of previously purchased products and each of the consumers among the plurality of consumers that have purchased the product type;

generating a consumer embedding vector for the consumer based on the hypergraph the consumer embedding vector indicating a relationship between the given consumer and the previously purchased products corresponding to the given consumer;

scoring an affinity between the consumer and the unpurchased product based on the product embedding vector and the consumer embedding vector, the scoring including calculating an affinity vector based on a distance between the product embedding vector and the consumer embedding vector;

retrieving a digital description of the unpurchased product in response to the affinity vector being less than an affinity threshold value; and presenting the digital description to the consumer.

16. The computer program product of claim 15, wherein generating the product embedding vector comprises:

generating a Laplacian matrix from an incidence matrix and a diagonal matrix of the hypergraph; and calculating a set of product eigenvectors of the Laplacian matrix.

17. The computer program product of claim 16, wherein the product embedding vector is a concatenation of the product eigenvectors.

18. The computer program product of claim 15, wherein generating the consumer embedding vector comprises calculating a relation between the consumer and purchased products based at least in part on Laplacian shrinkage regression analysis of the hypergraph.

19. The computer program product of claim 18, wherein the consumer embedding vector is a concatenation of the product eigenvectors.

20. The computer program product of claim 15, wherein the scoring is based at least in part of a distance between the product embedding vector and the consumer embedding vector.

* * * * *